(12) United States Patent
Clee et al.

(10) Patent No.: US 8,761,204 B2
(45) Date of Patent: Jun. 24, 2014

(54) PACKET ASSEMBLY MODULE FOR MULTI-CORE, MULTI-THREAD NETWORK PROCESSORS

(75) Inventors: James T. Clee, Orefield, PA (US);
Deepak Mital, Orefield, PA (US);
Robert J. Munoz, Round Rock, TX (US)

(73) Assignee: LSI Corporation, Milpitas, CA (US)

( * ) Notice: Subject to any disclaimer, the term of this patent is extended or adjusted under 35 U.S.C. 154(b) by 292 days.

(21) Appl. No.: 13/405,053

(22) Filed: Feb. 24, 2012

(65) Prior Publication Data
US 2012/0155495 A1 Jun. 21, 2012

Related U.S. Application Data

(63) Continuation-in-part of application No. 12/782,379, filed on May 18, 2010, and a continuation-in-part of application No. 12/782,393, filed on May 18, 2010, now Pat. No. 8,255,644, and a continuation-in-part of application No. 12/782,411, filed on May 18, 2010, now Pat. No. 8,407,707, and a continuation-in-part of application No. 12/971,742, filed on Dec. 17, 2010.

(60) Provisional application No. 61/486,811, filed on May 17, 2011.

(51) Int. Cl.
*H04J 3/24* (2006.01)

(52) U.S. Cl.
USPC ........... 370/474; 370/351; 370/389; 709/213; 709/214

(58) Field of Classification Search
USPC ......... 370/474, 392, 389, 230, 250, 218, 236, 370/202, 428; 709/213, 214, 250, 230, 239, 709/202, 233
See application file for complete search history.

(56) References Cited

U.S. PATENT DOCUMENTS

| 4,622,631 | A | 11/1986 | Frank et al. |
| 5,396,490 | A | 3/1995 | White et al. |
| 5,623,698 | A | 4/1997 | Stephenson et al. |
| 5,892,766 | A | 4/1999 | Wicki et al. |
| 5,943,283 | A | 8/1999 | Wong et al. |
| 6,038,630 | A | 3/2000 | Foster et al. |
| 6,195,335 | B1 | 2/2001 | Calvignac et al. |
| 6,480,489 | B1 * | 11/2002 | Muller et al. ................. 370/389 |
| 6,567,564 | B1 | 5/2003 | van der Wal |

(Continued)

FOREIGN PATENT DOCUMENTS

JP   H02-271444   11/1990

*Primary Examiner* — Charles C Jiang
*Assistant Examiner* — Walli Butt (57) ABSTRACT

Described embodiments provide for processing received data packets into packet reassemblies for transmission as output packets of a network processor. A packet assembler determines an associated packet reassembly of data portions and enqueues an identifier for each data portion in an input queue corresponding to the packet reassembly associated with the data portion. A state data entry corresponding to each packet reassembly identifies whether the packet reassembly is actively processed by the packet assembler. Iteratively, until an eligible data portion is selected, the packet assembler selects a given data portion from a non-empty input queue for processing and determines if the selected data portion corresponds to a reassembly that is actively processed. If the reassembly is active, the packet assembler sets the selected data portion as ineligible for selection. Otherwise, the packet assembler selects the data portion for processing and modifies the packet reassembly based on the selected data portion.

23 Claims, 5 Drawing Sheets

(56) References Cited

U.S. PATENT DOCUMENTS

| | | |
|---|---|---|
| 6,636,932 B1 | 10/2003 | Regev et al. |
| 6,704,794 B1 | 3/2004 | Kejriwal et al. |
| 7,027,443 B2 | 4/2006 | Nichols et al. |
| 7,089,346 B2 | 8/2006 | Cebulla et al. |
| 7,234,018 B1 | 6/2007 | Purcell et al. |
| 7,298,746 B1 | 11/2007 | De La Iglesia et al. |
| 7,394,822 B2 | 7/2008 | Mathews et al. |
| 7,461,208 B1 | 12/2008 | Caprioli et al. |
| 7,596,142 B1 | 9/2009 | MacAdam |
| 8,014,295 B2 | 9/2011 | Chang et al. |
| 2002/0029214 A1 | 3/2002 | Yianilos et al. |
| 2002/0165985 A1 | 11/2002 | Chen et al. |
| 2003/0033276 A1 | 2/2003 | Cheng et al. |
| 2003/0115417 A1 | 6/2003 | Corrigan |
| 2003/0123468 A1 | 7/2003 | Nong |
| 2004/0255209 A1 | 12/2004 | Gross |
| 2005/0027920 A1 | 2/2005 | Fitzsimmons et al. |
| 2005/0152352 A1 | 7/2005 | Jun et al. |
| 2006/0256783 A1 | 11/2006 | Ayrapetian et al. |
| 2007/0016756 A1 | 1/2007 | Hsieh et al. |
| 2007/0226798 A1 | 9/2007 | Sibert |
| 2008/0162793 A1 | 7/2008 | Chu et al. |
| 2010/0260198 A1 | 10/2010 | Rojas-Cessa et al. |
| 2011/0280244 A1* | 11/2011 | Gopinath et al. ............ 370/392 |

* cited by examiner

PACKET ASSEMBLY MODULE FOR MULTI-CORE, MULTI-THREAD NETWORK PROCESSORS

CROSS-REFERENCE TO RELATED APPLICATIONS

This application claims the benefit of the filing date of U.S. provisional application No. 61/486,811 filed May 17, 2011, the teachings of which are incorporated herein in their entireties by reference.

This application is a continuation-in-part, and claims the benefit of the filing date, of U.S. patent application Ser. No. 12/782,379 filed May 18, 2010, Ser. No. 12/782,393 now U.S. Pat. No. 8,255,644 filed May 18, 2010, Ser. No. 12/782,411 now U.S. Pat. No. 8,407,707 filed May 18, 2010, and Ser. No. 12/971,742 filed Dec. 17, 2010, the teachings of which are incorporated herein in their entireties by reference.

The subject matter of this application is related to U.S. patent application Ser. No. 12/430,438 filed Apr. 27, 2009, Ser. No. 12/729,226 filed Mar. 22, 2010, Ser. No. 12/729,231 filed Mar. 22, 2010, Ser. No. 12/963,895 filed Dec. 9, 2010, Ser. No. 12/974,477 filed Dec. 21, 2010, Ser. No. 12/975,823 filed Dec. 22, 2010, Ser. No. 12/975,880 filed Dec. 22, 2010, Ser. No. 12/976,045 filed Dec. 22, 2010, Ser. No. 12/976,228 filed Dec. 22, 2010, Ser. No. 12/979,551 filed Dec. 28, 2010, Ser. No. 12/979,665 filed Dec. 28, 2010, Ser. No. 12/979,800 filed Dec. 28, 2010, Ser. No. 13/046,717 filed Mar. 12, 2011, Ser. No. 13/046,719 filed Mar. 12, 2011, Ser. No. 13/046,726 filed Mar. 12, 2011, Ser. No. 13/192,104 filed Jul. 27, 2011, Ser. No. 13/192,140 filed Jul. 27, 2011, Ser. No. 13/192,187 filed Jul. 27, 2011, Ser. No. 13/232,422 filed Sep. 14, 2011, Ser. No. 13/250,898 filed Sep. 30, 2011, Ser. No. 13/274,726 filed Oct. 17, 2011, Ser. No. 13/310,961 filed Dec. 5, 2011, Ser. No. 13/316,145 filed Dec. 9, 2011, Ser. No. 13/359,690 filed Jan. 27, 2012, and Ser. No. 13/403,468 filed Feb. 23, 2012, the teachings of which are incorporated herein in their entireties by reference.

BACKGROUND

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors had diminishing performance improvements, or might actually slow down overall network processor throughput. Newer designs add hardware accelerators in a system on chip (SoC) architecture to offload certain tasks from the general-purpose processors, such as encryption/decryption, packet data inspections, and the like. These newer network processor designs are traditionally implemented with either i) a non-pipelined SoC architecture or ii) a fixed pipeline SoC architecture.

In a typical non-pipelined SoC architecture, general-purpose processors are responsible for each action taken by acceleration functions. A non-pipelined SoC architecture provides great flexibility in that the general-purpose processors can make decisions on a dynamic, packet-by-packet basis, thus providing data packets only to the accelerators or other processors that are required to process each packet. However, significant software overhead is involved in those cases where multiple accelerator actions might occur in sequence.

In a typical fixed-pipeline SoC architecture, packet data flows through the general-purpose processors and/or accelerators in a fixed sequence regardless of whether a particular processor or accelerator is required to process a given packet. For example, in a fixed sequence, a single accelerator within the fixed pipeline cannot be employed without employing the entire fixed pipeline. This fixed sequence might add significant overhead to packet processing and has limited flexibility to handle new protocols, limiting the advantage provided by using the accelerators.

A network processor that generates output packets ("reassemblies") might store reassembly data in a shared memory due to the potentially large size of the reassemblies. In a network processor implemented as an SoC, multiple processing modules might concurrently access the shared memory. The overall packet throughput of the network processor therefore might depend in part on the efficiency of each processing module's interface to the shared memory.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide for processing received data packets into packet reassemblies for transmission as output packets of a network processor. A packet assembler determines an associated packet reassembly of data portions and enqueues an identifier for each data portion in an input queue corresponding to the packet reassembly associated with the data portion. A state data entry corresponding to each packet reassembly identifies whether the packet reassembly is actively processed by the packet assembler. Iteratively, until an eligible data portion is selected, the packet assembler selects a given data portion from a non-empty input queue for processing and determines if the selected data portion corresponds to a reassembly that is actively processed. If the reassembly is active, the packet assembler sets the selected data portion as ineligible for selection. Otherwise, the packet assembler selects the data portion for processing and modifies the packet reassembly based on the selected data portion. The packet assembler prevents back-to-back data portions associated with the same reassembly from head-of-line blocking processing of data portions for other reassemblies.

BRIEF DESCRIPTION OF THE DRAWING FIGURES

Other aspects, features, and advantages of the present invention will become more fully apparent from the following detailed description, the appended claims, and the accompanying drawings in which like reference numerals identify similar or identical elements.

DETAILED DESCRIPTION

Described embodiments provide for processing received data packets into packet reassemblies for transmission as output packets of a network processor. A packet assembler determines an associated packet reassembly of data portions and enqueues an identifier for each data portion in an input queue corresponding to the packet reassembly associated with the data portion. A state data entry corresponding to each packet reassembly identifies whether the packet reassembly is actively processed by the packet assembler. Iteratively, until an eligible data portion is selected, the packet assembler selects a given data portion from a non-empty input queue for processing and determines if the selected data portion corresponds to a reassembly that is actively processed. If the reassembly is active, the packet assembler sets the selected data portion as ineligible for selection. Otherwise, the packet assembler selects the data portion for processing and modifies the packet reassembly based on the selected data portion. The packet assembler prevents back-to-back data portions associated with the same reassembly from head-of-line blocking processing of data portions for other reassemblies.

Table 1 defines a list of acronyms employed throughout this specification as an aid to understanding the described embodiments of the present invention:

TABLE 1

| | | | |
|---|---|---|---|
| USB | Universal Serial Bus | FIFO | First-In, First-Out |
| SATA | Serial Advanced Technology Attachment | I/O | Input/Output |
| | | DDR | Double Data Rate |
| | | DRAM | Dynamic Random Access Memory |
| SCSI | Small Computer System Interface | MMB | Memory Manager Block |
| SAS | Serial Attached SCSI | µP | Microprocessor |
| | | PLB | Processor Local Bus |
| PCI-E | Peripheral Component Interconnect Express | MPP | Modular Packet Processor |
| | | AAL5 | ATM Adaptation Layer 5 |
| | | SED | Stream Editor |
| | | THID | Thread Identifier |
| SoC | System-on-Chip | PQM | Pre-Queue Modifier |
| AXI | Advanced eXtensible Interface | FBI | Function Bus Interface |
| | | CCL | Classification Completion List |
| | | SEM | Semaphore Engine |
| AMBA | Advanced Microcontroller Bus Architecture | PCM | Per Context Memory |
| | | PDU | Protocol Data Unit |
| | | PIC | Packet Integrity Checker |
| PAB | Packet Assembly Block | CRC | Cyclic Redundancy Check |
| | | RAT | Reassembly Active Tracking |
| MTM | Modular Traffic Manager | | |
| DBC | Data Buffer Controller | | |
| HE | Hash Engine | | |
| SENG | State Engine | | |
| TID | Task Identifier | | |
| SCH | Scheduler | | |
| SPP | Security Protocol Processor | | |
| TIL | Task Input Logic | | |
| TCP | Transmission Control Protocol | | |
| SDWRR | Smooth Deficit Weighted Round-Robin | | |
| IP | Internet Protocol | | |

Figure 1:
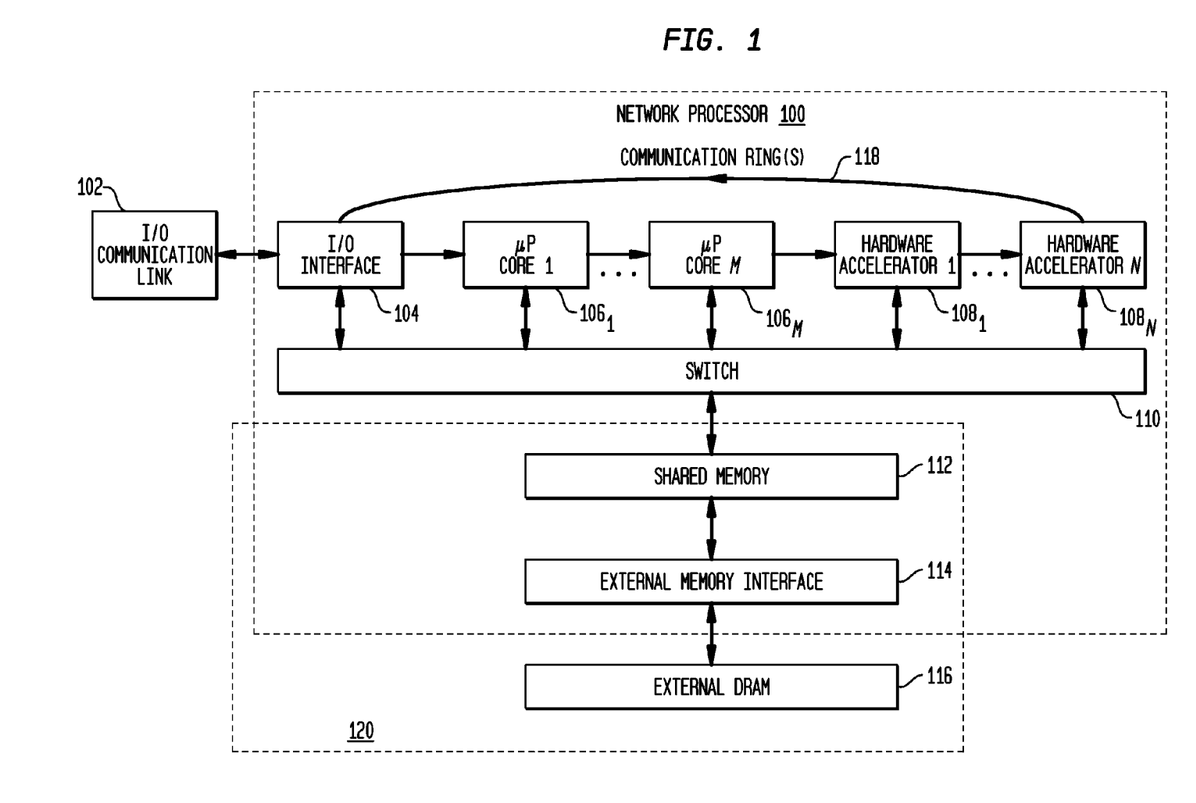
FIG. 1 shows a block diagram of a network processor operating in accordance with exemplary embodiments of the present invention.

FIG. 1 shows a block diagram of an exemplary network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (µP) cores $106_1$-$106_M$, and one or more hardware accelerators $108_1$-$108_N$, where M and N are integers greater than or equal to 1. Network processor 100 also includes external memory interface 114 for communication with external memory 116. External memory 116 might typically be implemented as a dynamic random-access memory (DRAM), such as a double-data-rate three (DDR-3) DRAM, for off-chip storage of data. In some embodiments, such as shown in FIG. 1, each of the one or more I/O interfaces, µP cores and hardware accelerators might be coupled through switch 110 to shared memory 112. Switch 110 might be implemented as a non-blocking crossbar switch such as described in related U.S. patent application Ser. No. 12/430,438 filed Apr. 27, 2009, Ser. No. 12/729,226 filed Mar. 22, 2010, and Ser. No. 12/729,231 filed Mar. 22, 2010, which are incorporated by reference herein.

I/O interface 104 might typically be implemented as hardware that connects network processor 100 to one or more external devices through I/O communication link 102. I/O communication link 102 might generally be employed for communication with one or more external devices, such as a computer system or networking device, which interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between I/O interface 104 and shared memory 112 through switch 110.

In embodiments of the present invention, shared memory 112 is a conventional memory operating as a cache that might be allocated and/or subdivided. For example, shared memory 112 might include one or more FIFO queues that might be dynamically allocated to the various µP cores 106 and hardware accelerators 108. External memory interface 114 couples shared memory 112 to one or more external memories, shown as external memory 116, to provide off-chip storage of data not currently in use by the various µP cores 106 and hardware accelerators 108 to free space in shared memory 112. As indicated by the dashed line, shared memory 112 and external memory 116 might generally be referred to as system memory 120. In general, system memory 120 might be addressed as a single address space such that various accelerators 108 can seamlessly request data whether the data is stored in shared memory 112 or external memory 116.

Hardware accelerators 108 might interact with each other, for example, by one or more communication bus rings 118 that pass "tasks" from a source core to a destination core. Tasks allow network processor 100 to process a wide variety of data and control messages more efficiently than with a fixed pipeline or non-pipelined architecture. As discussed in more detail below, the sequence of processing of the tasks depends on i) the type of packet and ii) the type of processing performed by the various cores on a particular packet (or group of packets), control message, or other data. This is referred to herein as a "Virtual Pipeline™", a trademark of LSI Corporation, of Milpitas, Calif. In embodiments of the present invention, each of a plurality of virtual pipelines operate by each processing module of network processor 100 receiving a task, executing that task, and assigning a subsequent task to another (or the same) processing module depending on an identification of a virtual pipeline corresponding to the task. As described herein, tasks are instructions to the destination core to perform certain functions, and a task might be passed substantially as described in related U.S. patent application Ser. Nos. 12/782,379, 12/782,393, and 12/782,411 all filed May 18, 2010, which are incorporated by reference herein.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via I/O communication link 102. Network processor 100 might receive data packets from one or more active data streams concurrently from I/O communication link 102. I/O interface 104 might parse the received data packet and provide the received data packet, via switch 110, to a buffer in shared memory 112.

I/O interface 104 provides various types of I/O interface functions and, in exemplary embodiments described herein, is a command-driven hardware accelerator that connects network processor 100 to external devices. Received packets are preferably placed in shared memory 112 and then one or more corresponding tasks are generated. Transmitted packets are preferably generated from data in shared memory 112 for one or more corresponding tasks and might be transmitted out of network processor 100. Exemplary I/O interfaces include Ethernet I/O adapters providing integrity checks of incoming data. The I/O adapters might also provide timestamp data for received and transmitted packets that might be used to implement features such as timing over packet (e.g., specified in the standard recommendations of IEEE 1588). In alternative embodiments, I/O interface 104 might be implemented as input (receive) only or output (transmit) only interfaces.

The various μP cores 106 and hardware accelerators 108 of network processor 100 might include several exemplary types of processors or accelerators. For example, the various μP cores 106 might be implemented as Pentium® or Power PC® processors, or a combination of different processor types (Pentium® is a registered trademark of Intel Corporation, and Power PC® is a registered trademark of IBM). The various hardware accelerators 108 might include, for example, one or more function-specific modules, such as a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The MTM is a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighed round robin (SDWRR) for every queue and scheduler. The MTM might also support multicasting. Each copy of a packet is scheduled independently and traverses down one or more virtual pipelines enabling multicast with independent encapsulations or any other processing.

The MTM might also contain a special purpose processor that can be used for fine-grained control of scheduling decisions. The MTM might be used to make discard decisions as well as scheduling and shaping decisions. The MTM might operate substantially as described in related U.S. patent application Ser. No. 13/232,422, filed Sep. 14, 2011 and Ser. No. 13/250,898 filed Sep. 30, 2011, which are incorporated by reference herein.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED can become the outgoing packet data and can also update task parameters.

The RegEx engine is a packet search engine for state-based cross-packet pattern matching. The RegEx engine is multi-threaded accelerator. An exemplary RegEx engine might be implemented such as described in U.S. Pat. No. 7,430,652 to Hundley, U.S. Pat. No. 7,899,904 to Ruehle and U.S. Pat. No. 7,512,592 to Lemoine, the teachings of which are incorporated by reference herein in their entireties.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The MPP is a multi-threaded special purpose processor that provides tree based longest prefix and access control list classification. The MPP also has a hardware hash-based classification capability with full hardware management of hash-table additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the MPP. The MPP architecture might be able to store all per thread states in memory instead of in register files. The MPP might operate substantially as described in related U.S. patent application Ser. No. 12/974,477 filed Dec. 21, 2010, Ser. Nos. 12/975,823, 12/975,880, 12/976,045, and 12/976,228 all filed Dec. 22, 2010, which are incorporated by reference herein. The MPP might also include hash functionality such as described in related U.S. patent application Ser. Nos. 13/046,717, 13/046,719, and 13/046,726 all filed Mar. 12, 2011, which are incorporated by reference herein.

The MMB allocates and frees memory resources in shared memory 112. Memory is allocated for such applications as task FIFO storage, packet data storage, hash-table collision handling, timer event management, and traffic manager queues. The MMB provides reference counts for each block of memory within shared memory 112. Multiple reference counts allow for more efficient storage of information, such as multicast traffic (data to be sent to multiple destinations) or for retransmission. Multiple reference counts remove a need for replicating data each time the data is needed. The MMB preferably tracks the memory allocations using a stack-based approach since a memory block recently released is preferably the next block to be allocated for a particular task, reducing cache thrashing and cache tracking overhead. Blocks in shared memory 112 might be dynamically allocated by the MMB to store data, and blocks might be available in various predetermined sizes. For example, the blocks might typically be in one of the following sizes: 256, 2048, 16384, and 65536 bytes. The MMB might operate substantially as described in related U.S. patent application Ser. No. 12/963,895 filed Dec. 9, 2010, and Ser. No. 13/359,690 filed Jan. 27, 2012, which are incorporated by reference herein.

The PAB is a command driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization. The PAB might operate substantially as described in related U.S. patent application Ser. No. 12/971,742 filed Dec. 17, 2010, which is incorporated by reference herein.

Figure 2:
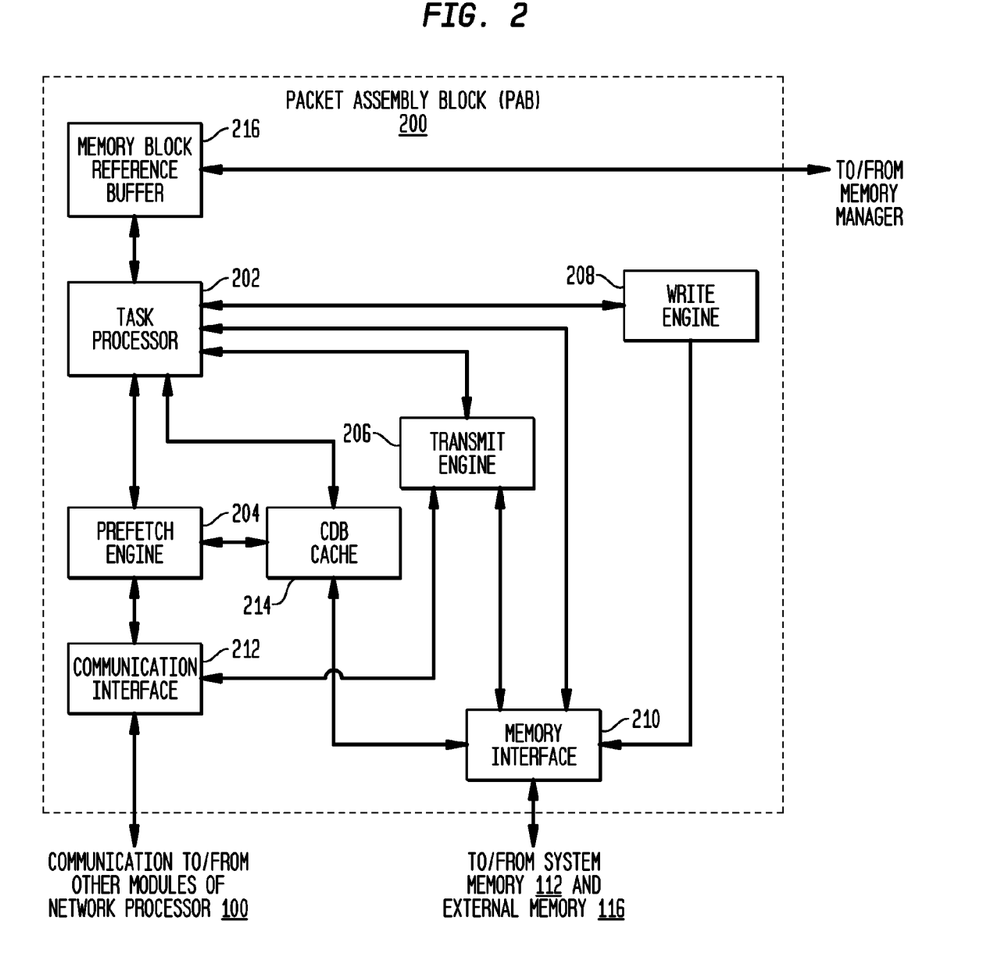
FIG. 2 shows a block diagram of a packet assembly submodule of the network processor of FIG. 1.

FIG. 2 shows a block diagram of an exemplary packet assembly block (PAB) 200, in accordance with embodiments of the present invention. As shown in FIG. 2, PAB 200 includes communication interface 212 that is in communication with one or more modules of network processor 100, for example, the various μP cores 106 and hardware accelerators 108. PAB 200 might typically receive requests to assemble and transmit data packets ("reassemblies") from a requesting module of network processor 100 through a communication ring of network processor 100 coupled to communication interface 212, such as described in related U.S. patent application Ser. Nos. 12/782,379, 12/782,393, and 12/782,411, all filed May 18, 2010. Thus, PAB 200 might typically receive tasks from other modules of network processor 100. As shown in FIG. 2, PAB 200 might also include memory interface 210. Memory interface 210 might be employed to provide synchronization for read/write coherency to system memory 112 and/or external memory 116. Memory interface 210 might typically write to system memory 112 in memory words that are a maximum number of bytes that can be transferred to system memory 112 in a single clock cycle.

The tasks received by PAB 200 might contain commands, data or pointers that specify how a reassembly corresponding to the task should be generated. Typical tasks indicate the reassembly operation associated with the task, for example, enqueue, transmit or discard operations. A given task might indicate multiple operations, for example, enqueue with transmit. Received tasks might be stored one or more task input queues (not shown) of communication interface 212. For example, some embodiments might include a first queue for high priority tasks and a second queue for low priority tasks. Tasks for a given input queue are processed in order. A task might also include a reassembly index to allow PAB 200 to identify the reassembly to which a given task corresponds. The reassembly index is a unique identifier assigned to each reassembly. A particular index might be reused by PAB 200, for example, once all the reassembly data is sent to another processing module of network processor 100 (e.g., after a discard with deallocate operation).

PAB 200 might typically operate simultaneously on a large number of simultaneous reassemblies. In some embodiments, PAB 200 might support up to $2^{24}$ simultaneous reassemblies. PAB 200 might store the reassemblies in system memory 120, for example, by way of memory interface 210. System memory 120 might typically be divided into small blocks of memory that are available to be allocated to the various processing modules of network processor 100, on an as needed basis. Network processor 100 might employ a memory management module, for example a memory management block (MMB) to allocate and deallocate the memory blocks. Embodiments of PAB 200 might include memory block reference buffer 216. Memory block reference buffer 216 might maintain a small number of memory block addresses that are allocated by the MMB for use by PAB 200. As PAB 200 processes input packets, memory block reference buffer 216 might request memory blocks from the MMB.

As described herein, PAB 200 generates reassemblies based on data packets received by network processor 100. A reassembly is generated based on one or more of the received data packets and might be sent as an output data packet of network processor 100 to one or more destination devices. As described, network processor 100 might generate one or more tasks corresponding to a received data packet, where the tasks are employed to communicate between the one or more processing modules of network processor 100. PAB 200 maintains control data for each reassembly that is not yet complete ("per-reassembly state data"). The per-reassembly state data might typically include i) the memory address of the corresponding reassembly data, if any, and ii) the amount of reassembly data stored (possibly zero). To support a large number of simultaneous reassemblies, PAB 200 desirably stores the associated per-reassembly state data in system memory 120.

In general, PAB 200 requires some finite amount of time to process a particular input packet, for example, to read packet data from system memory 112 or to write new packet data to system memory 112. While PAB 200 is processing a given input packet, additional input packets might be received by network processor 100. Typically, PAB 200 might employ an input queue to temporarily store input packet data while PAB 200 is processing an older input packet. If the rate at which input packets are received is greater than the rate at which PAB 200 processes the input packets, the input queue might become full and, thus, be unable to store any additional input packets.

As described herein, PAB 200 maintains a per-reassembly state to track the state of each reassembly corresponding to an output packet being assembled by PAB 200. PAB 200 might be pipelined such that at (1) an early stage in the pipeline, PAB 200 reads the per-reassembly state data from system memory 120, (2) later in the pipeline PAB 200 uses the per-reassembly state data to process a corresponding input packet, and (3) near the end of the pipeline, PAB 200 updates the per-reassembly state data to reflect the effect of the input packet on the reassembly. While a reassembly is being processed by PAB 200, other input packets corresponding to the same reassembly might be received by network processor 100. These input packets should be prevented from changing the corresponding per-reassembly state data if a prior packet is not yet completed the processing pipeline and updated the per-reassembly state data. As shown in FIG. 2, the processing pipeline of PAB 200 might include prefetch engine 204, task processor 202, CDB cache 214, transmit engine 206, and write engine 208, and the functionality of each might be substantially similar as described in related patent application Ser. No. 12/971,742, filed on Dec. 17, 2010.

In some embodiments, when a packet is received and enters the processing pipeline of PAB 200, PAB 200 determines the reference value of the per-reassembly state data corresponding to the received packet. If PAB 200 is processing an older packet corresponding to the same per-reassembly state data, the new packet might be stalled until the older packet reaches the end of the pipeline of PAB 200. For example, "back-to-back" packets might be received for the same per-reassembly state data, although the packets are not necessarily received consecutively, merely that they are received by PAB 200 close enough in time that the older packet is still active in the pipeline of PAB 200 when the newer packet is ready to be processed. If a new packet is stalled in a back-to-back situation, PAB 200 might be relatively inefficient at packet processing. For example, without considering which reassembly is associated with a received packet, packets for inactive reassemblies might be unnecessarily stalled, or head-of-line blocked, by prior packets for other reassemblies. Described embodiments, by tracking active reassemblies, prevent head-of-line blocking for packet processing of packets for inactive reassemblies.

In some embodiments, PAB 200 provides a processing pipeline that avoids synchronization delays caused by back-to-back packets corresponding to the same reassembly. For example, PAB 200 tracks the active status of all reassemblies being processed in the pipeline. As described herein, input packets might be placed into one of a plurality of input queues of PAB 200. PAB 200 then might select a next packet to process from a non-empty queue by employing the active status indicator to avoid selecting a packet for processing that corresponds to per-reassembly state data that is still active in the pipeline.

As described herein, PAB 200 includes multiple input queues from which it may select a next packet to process. For example, PAB 200 might choose between the input queues by a round robin selection from any non-empty queues. PAB 200 maintains a status indicator for each of the one or more active reassemblies such that a queued packet corresponding to an active reassembly is not selected. Thus, embodiments of PAB 200 might process received input packets in a different order than the order in which the packets were received and queued. Thus, PAB 200 might assign all received packets corresponding to the same reassembly to the same input queue, such that packets for each reassembly are still processed in the order in which the packets were received and queued. In order to ensure correct functionality, it is necessary that the assignment of input traffic such that a newer packet does not update a reassembly before an older packet.

Figure 3:
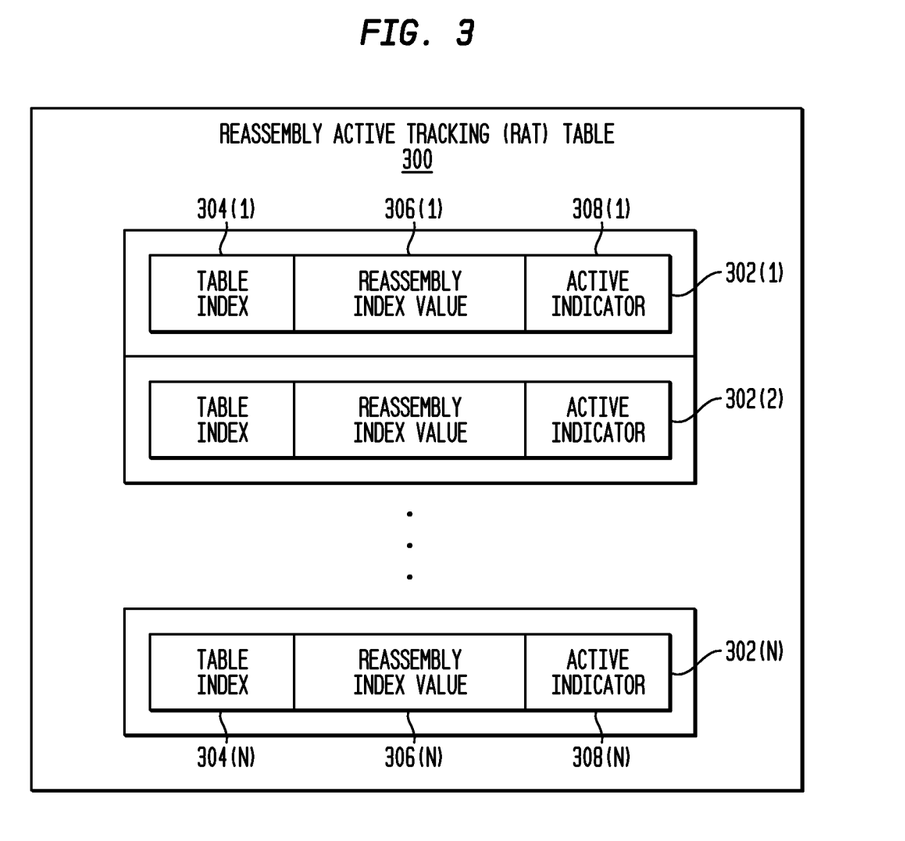
FIG. 3 shows an exemplary block diagram of a reassembly active tracking table of the packet assembly submodule of FIG. 2.

Embodiments of PAB 200 maintain a table of reassembly indexes that are active in the processing pipeline of PAB 200, the Reassembly Active Tracking (RAT) table. FIG. 3 shows an exemplary embodiment of RAT table 300. As shown, RAT table 300 includes one or more entries 302, each entry corresponding to a reassembly index. Each entry has a corresponding RAT table index 304(1)-304(N), and each entry includes the corresponding reassembly index value, shown as 306(1)-306(N), and active indicators 308(1)-308(N). The active indicator is set when the corresponding reassembly is active in the pipeline of PAB 200. When a new packet is read from an input queue, the reassembly index is written to an available entry in RAT table 300 and the corresponding active indicator is set. As shown, RAT table 300 supports up to N entries. In some embodiments, N might be selected such as to be equal to the depth of the processing pipeline of PAB 200, such that there might always be at least one available entry in RAT table 300 to receive a new packet. The RAT table index might be passed, along with the packet, to the processing pipeline of PAB 200. When a packet reaches the end of the pipeline of PAB 200, the RAT table entry associated with the RAT table index has the corresponding active indicator 308 cleared, as the reassembly is no longer active in the pipeline of PAB 200.

Figure 4:
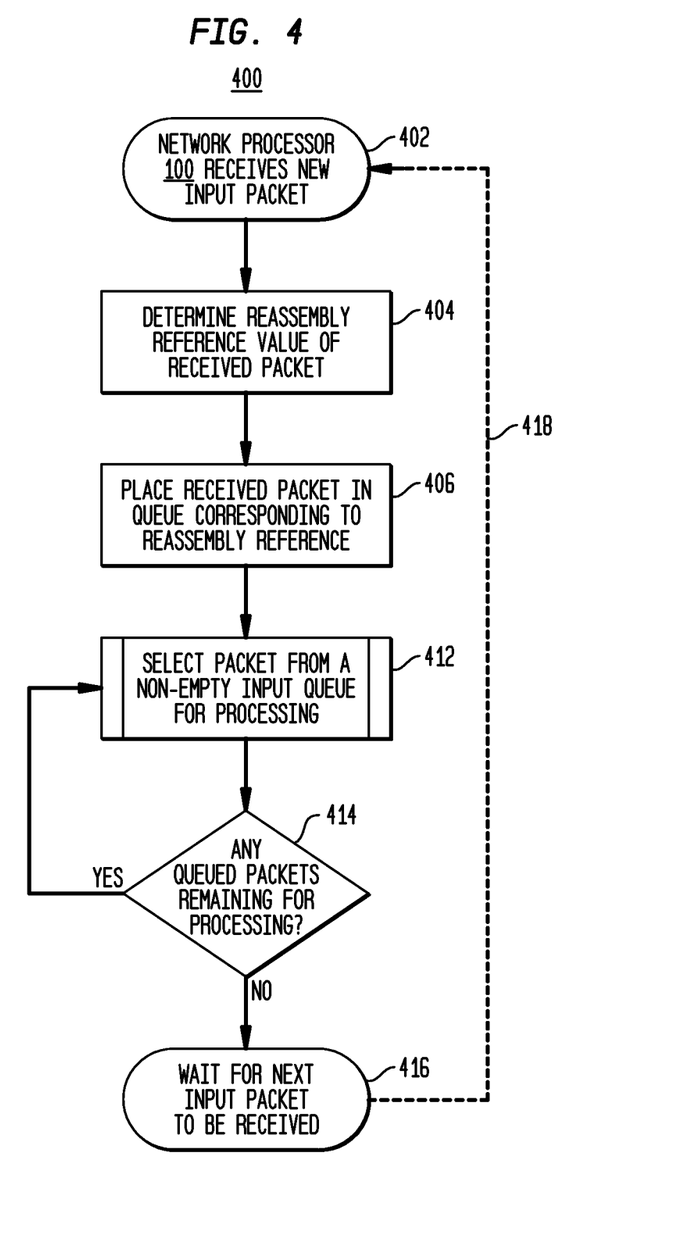
FIG. 4 shows an exemplary flow diagram of a packet processing algorithm employed by the packet assembly submodule of FIG. 2.

FIG. 4 shows a flow diagram of process 400 for processing received packets by PAB 200. At step 402, network processor 100 receives an input packet, and provides one or more tasks corresponding to the packet to PAB 200. At step 404, PAB 200 determines the reassembly reference value corresponding to the received packet, and at step 406, the input packet data is added to an input queue of PAB 200 corresponding to the reassembly reference value. In some embodiments, each input task corresponds to a reassembly that is uniquely identified by a 24-bit reassembly index. PAB 200 executes all tasks for a given reassembly in the order in which the tasks are received by PAB 200. Thus, as described herein, all tasks with the same reassembly index are sent to the same input queue. Task data might also include a Task Order ID field (TOID), which PAB 200 might employ, either in conjunction with, or alternatively to, the reassembly index to select the input queue. Alternatively, either the reassembly index value or the TOID might be mapped to a smaller number to select a particular input queue.

At step 412, PAB 200 selects a packet from a non-empty input queue for processing. Step 412 is shown in greater detail in FIG. 5. At step 414, if any queued packets remain in the input queues, process 400 returns to step 412 to select another packet for processing. If, at step 414, no queued packets remain in the input queues, PAB 200 might idle at step 418 until one or more new input packets are received, at which point process 400 returns to step 402, as indicated by dashed line 418.

Figure 5:
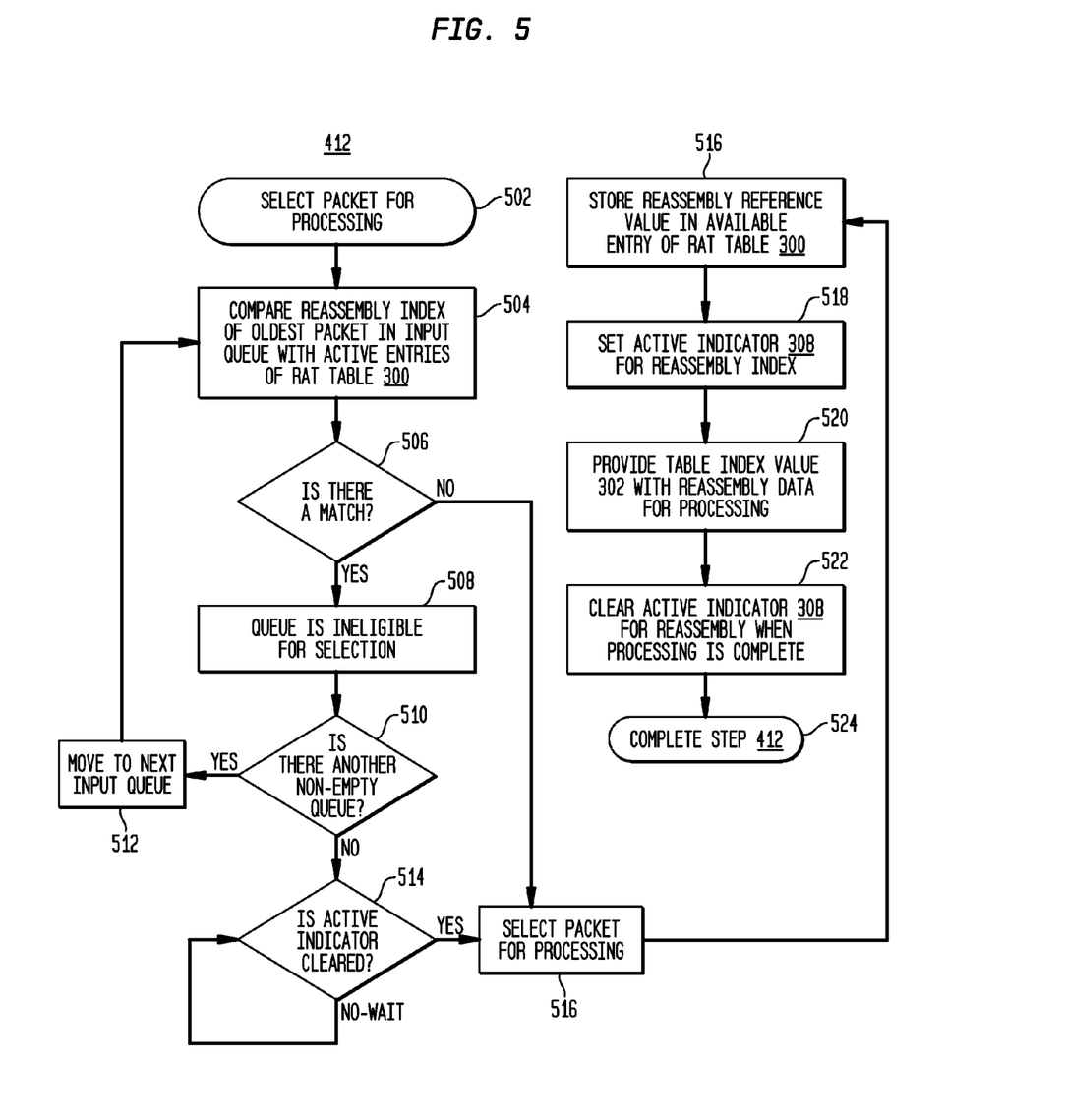
FIG. 5 shows an exemplary flow diagram of a packet selection and processing sub-process of the packet processing algorithm of FIG. 4.

FIG. 5 shows greater detail of the packet selection and processing sub-process of step 412 of FIG. 4. At step 502, selection and processing sub-process 412 begins. At step 504, PAB 200 attempts to avoid back-to-back packet synchronization delay by comparing the reassembly index of the oldest packet in each input queue with the contents of every active entry in RAT table 300. At step 506, if the comparison matches the oldest packet of a particular input queue, then at step 508, that queue is not eligible for selection to have a packet processed by PAB 200. At step 510, if there are no other non-empty input queues, the PAB 200 processing pipeline waits at step 514 for the corresponding active indicator 308 of RAT table 300 to be cleared so a subsequent packet can be processed at step 516. If, at step 510, there are other non-empty input queues, at step 512 PAB 200 selects a subsequent non-empty input queue, and returns to step 504 to compare the reassembly index of the oldest packet in the subsequent input queue with the contents of every active entry in RAT table 300. Thus, if there are any available input packets for other reassemblies at any time while the original packet is being processed in the pipeline, the other input packets are processed without waiting for the original packet to complete processing.

If, at step 506, the comparison does not match the oldest packet of a particular input queue, then at step 516, that queue is selected to have its oldest packet processed by PAB 200. Since the reassembly reference value is not already stored in RAT table 300, at step 517, the reassembly reference value is added to RAT table 300 (e.g., in field 306). At step 518, active indicator 308 in RAT table 300 is set to indicate that the reassembly index corresponding to the packet selected at step 516 is actively being processed by PAB 200. At step 520, the table index value 302 corresponding to the selected packet is provided, along with the reassembly data, to the processing pipeline of PAB 200. Once processing of the selected packet is complete, at step 522, the corresponding active indicator 308 of RAT table 300 is cleared, such that a subsequent packet for the same reassembly could be selected for processing. At step 524, sub-process 412 completes.

Thus, as described herein, embodiments of the present invention provide for processing received data packets into packet reassemblies for transmission as output packets of a network processor. A packet assembler determines an associated packet reassembly of data portions and enqueues an identifier for each data portion in an input queue corresponding to the packet reassembly associated with the data portion. A state data entry corresponding to each packet reassembly identifies whether the packet reassembly is actively processed by the packet assembler. Iteratively, until an eligible data portion is selected, the packet assembler selects a given data portion from a non-empty input queue for processing and determines if the selected data portion corresponds to a reassembly that is actively processed. If the reassembly is active, the packet assembler sets the selected data portion as ineligible for selection. Otherwise, the packet assembler selects the data portion for processing and modifies the packet reassembly based on the selected data portion. The packet assembler prevents back-to-back data portions associated with the same reassembly from head-of-line blocking processing of data portions for other reassemblies.

While the exemplary embodiments of the present invention have been described with respect to processing blocks in a software program, including possible implementation as a digital signal processor, micro-controller, or general-purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts that have been described and illustrated in order to explain the nature of this invention might be made by those skilled in the art without departing from the scope of the invention as expressed in the following claims.

We claim:

1. An apparatus for processing received data packets into one or more packet reassemblies for transmission as output packets, the apparatus comprising:
   a shared system memory configured to receive data packets associated with each packet reassembly;
   a packet assembly processor configured to:
      determine an associated packet reassembly of processed data portions from a plurality of processing modules;
      enqueue an identifier for each processed data portion in one of a plurality of input queues, the one input queue corresponding to the packet reassembly associated with the processed data portion;
      maintain a state data entry corresponding to each packet reassembly, the state data entry having an active indicator that identifies whether the packet reassembly is actively processed by the packet assembly processor, wherein two or more concurrently active packet reassemblies are permitted;
      iteratively, until an eligible processed data portion is selected:
         select a given processed data portion from a non-empty input queue for processing by the packet assembly processor;
         determine if the active indicator of packet reassembly associated with the selected processed data portion is set, wherein (i) if the active indicator is set, the packet assembly processor is configured to set the selected processed data portion as ineligible for selection, otherwise, (ii) if the active indicator is not set, the packet assembly processor is configured to select the processed data portion for processing and modify the packet reassembly based on the selected processed data portion,
      thereby the packet assembly processor is configured to prevent back-to-back processed data portions associated with the same reassembly from head-of-line blocking processing of processed data portions for other reassemblies.

2. The apparatus of claim 1, wherein the packet assembly processor is configured to:
   store the state data entries in a reassembly active tracking table, the reassembly active tracking table comprising N entries, where N is a positive integer, each entry comprising (i) a table index value, (ii) a reassembly index value and (iii) the active indicator corresponding to the reassembly index value.

3. The apparatus of claim 2, wherein N is substantially equivalent to a number of pipeline processing stages of the packet assembly processor.

4. The apparatus of claim 2, wherein the packet assembly processor is configured to:
provide the table index value and the associated processed data portion to a processing module of the packet assembly processor for modifying the corresponding reassembly.

5. The apparatus of claim 2, wherein the packet assembly processor is configured to:
clear the active indicator for a given reassembly when processing of a prior processed data portion for the given reassembly is complete.

6. The apparatus of claim 1, wherein, if all non-empty input queues are ineligible for selection, the packet assembly processor is configured to wait for a first non-empty input queue to become eligible for selection.

7. The apparatus of claim 1, wherein the packet assembly processor is configured to select the oldest processed data portion from each non-empty input queue.

8. The apparatus of claim 1, wherein the packet assembly processor is configured to:
provide completed reassemblies as output packets for transmission by the network processor.

9. The apparatus of claim 1, wherein the output packet is constructed in accordance with instructions from one or more tasks generated by the network processor, each task associated with a packet reassembly.

10. The apparatus of claim 1, wherein each of the one or more associated tasks comprises:
an identifier corresponding to the packet assembly;
data corresponding to the received packet associated with the task; and
an identifier of an operation on the packet assembly,
wherein the data corresponding to the processed-packet portion is one of: (i) data of the received packet and (ii) a pointer to an address in the system memory where the data of the received packet is stored.

11. The apparatus of claim 1, wherein the packet assembly processor is further configured to:
enter a drop mode upon detecting that an input queue depth has reached a threshold.

12. The apparatus of claim 1, wherein the network processor is implemented in an integrated circuit.

13. The apparatus of claim 1, wherein two or more processed data portions associated with the same reassembly are back-to-back if the two or more processed data portions are received by the packet assembler within a predetermined amount of time of each other.

14. A method of assembling output packets of a network processor, the method comprising:
storing, by a shared system memory, data packets associated with each packet reassembly;
by a packet assembly processor:
determining an associated packet reassembly of processed data portions from a plurality of processing modules;
enqueuing an identifier for each processed data portion in one of a plurality of input queues, the one input queue corresponding to the packet reassembly associated with the processed data portion;
maintaining a state data entry corresponding to each packet reassembly, the state data entry having an active indicator that identifies whether the packet reassembly is actively processed by the packet assembly processor, wherein two or more concurrently active packet reassemblies are permitted;
iteratively, until an eligible processed data portion is selected:
selecting a given processed data portion from a non-empty input queue for processing by the packet assembly processor;
determining if the active indicator of packet reassembly associated with the selected processed data portion is set, wherein (i) if the active indicator is set, setting the selected processed data portion as ineligible for selection, otherwise, (ii) if the active indicator is not set, selecting the processed data portion for processing and modifying the packet reassembly based on the selected processed data portion,
thereby preventing back-to-back processed data portions associated with the same reassembly from head-of-line blocking processing of processed data portions for other reassemblies.

15. The method of claim 14, further comprising:
storing the state data entries in a reassembly active tracking table, the reassembly active tracking table comprising N entries, where N is a positive integer, each entry comprising (i) a table index value, (ii) a reassembly index value and (iii) the active indicator corresponding to the reassembly index value.

16. The method of claim 15, wherein N is substantially equivalent to a number of pipeline processing stages of the packet assembly processor.

17. The method of claim 15, further comprising:
providing the table index value and the associated processed data portion to a processing module of the packet assembly processor for modifying the corresponding reassembly.

18. The method of claim 15, further comprising:
clearing the active indicator for a given reassembly when processing of a prior processed data portion for the given reassembly is complete; and
waiting, if all non-empty input queues are ineligible for selection, for a first non-empty input queue to become eligible for selection.

19. The method of claim 14, further comprising:
selecting the oldest processed data portion from each non-empty input queue; and
providing completed reassemblies as output packets for transmission by the network processor.

20. The method of claim 14, wherein two or more processed data portions associated with the same reassembly are back-to-back if the two or more processed data portions are received by the packet assembler within a predetermined amount of time of each other.

21. A non-transitory machine-readable medium, having encoded thereon program code, wherein, when the program code is executed by a machine, the machine implements a method of assembling output packets of a network processor, the method comprising:
storing, by a shared system memory, data packets associated with each packet reassembly;
by a packet assembly processor:
determining an associated packet reassembly of processed data portions from a plurality of processing modules;
enqueuing an identifier for each processed data portion in one of a plurality of input queues, the one input queue corresponding to the packet reassembly associated with the processed data portion;

maintaining a state data entry corresponding to each packet reassembly, the state data entry having an active indicator that identifies whether the packet reassembly is actively processed by the packet assembly processor, wherein two or more concurrently active packet reassemblies are permitted;

iteratively, until an eligible processed data portion is selected:

selecting a given processed data portion from a non-empty input queue for processing by the packet assembly processor;

determining if the active indicator of packet reassembly associated with the selected processed data portion is set, wherein (i) if the active indicator is set, setting the selected processed data portion as ineligible for selection, otherwise, (ii) if the active indicator is not set, selecting the processed data portion for processing and modifying the packet reassembly based on the selected processed data portion, thereby preventing back-to-back processed data portions associated with the same reassembly from head-of-line blocking processing of processed data portions for other reassemblies.

22. The non-transitory machine-readable medium of claim 21, further comprising:

storing the state data entries in a reassembly active tracking table, the reassembly active tracking table comprising N entries, where N is a positive integer, each entry comprising (i) a table index value, (ii) a reassembly index value and (iii) the active indicator corresponding to the reassembly index value, wherein N is substantially equivalent to a number of pipeline processing stages of the packet assembly processor.

23. The non-transitory machine-readable medium of claim 21, wherein two or more processed data portions associated with the same reassembly are back-to-back if the two or more processed data portions are received by the packet assembler within a predetermined amount of time of each other.

* * * * *